US012609883B2

(12) United States Patent  
Ardito

(10) Patent No.: US 12,609,883 B2  
(45) Date of Patent: Apr. 21, 2026

(54) LAYER-2 PATH DISCOVERY OF ACTIVE PROBE CONNECTION MONITORING

(71) Applicant: Cisco Technology, Inc., San Jose, CA (US)

(72) Inventor: Filippo Ardito, Mont-sur-Rolle (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/812,413

(22) Filed: Aug. 22, 2024

(65) Prior Publication Data

US 2026/0058896 A1 Feb. 26, 2026

(51) Int. Cl.  
*H04L 43/50* (2022.01)  
*H04L 43/065* (2022.01)  
*H04L 43/12* (2022.01)

(52) U.S. Cl.  
CPC ............ *H04L 43/50* (2013.01); *H04L 43/065* (2013.01); *H04L 43/12* (2013.01)

(58) Field of Classification Search  
CPC ........ H04L 43/50; H04L 43/065; H04L 43/12  
See application file for complete search history.

(56) References Cited

U.S. PATENT DOCUMENTS

| | | | | |
|---|---|---|---|---|
| 10,848,402 B1 * | 11/2020 | Haddow | ............... | H04L 43/045 |
| 11,032,124 B1 * | 6/2021 | Haddow | ................ | H04L 41/12 |
| 2003/0097438 A1 * | 5/2003 | Bearden | ................ | H04M 7/006 |
| | | | | 709/224 |
| 2015/0012626 A1 | 1/2015 | Squire et al. | | |
| 2020/0092251 A1 | 3/2020 | Peterson et al. | | |
| 2021/0126844 A1 * | 4/2021 | Haddow | ............. | H04L 43/0888 |

FOREIGN PATENT DOCUMENTS

| | | | | |
|---|---|---|---|---|
| EP | 1780943 A1 * | 5/2007 | ............. | H04L 41/12 |

OTHER PUBLICATIONS

Servicenow Documentation: "Layer 2 Discovery", Washington DC IT Operations Management, Last Updated on Feb. 1, 2024, Retrieved from https://docs.servicenow.com/bundle/washingtondc-it-operations-management/page/product/discovery/concept/c_Layer2Discovery.html on May 27, 2024, pp. 1-6.  
Stott D.T., "Layer-2 Path Discovery Using Spanning Tree MIBs", BME, Mar. 7, 2002, Retrieved from http://w3.tmit.bme.hu/courses/onlab/library/papers/stott02pathdisco.pdf, pp. 1-23.

* cited by examiner

*Primary Examiner* — Philip C Lee  
(74) *Attorney, Agent, or Firm* — Merchant & Gould P.C.; Kenneth J. Heywood

(57) ABSTRACT

In one implementation, a device may obtain telemetry data from Layer-2 network devices on a test path trace of a computing network. The device may generate, based on the telemetry data, a correlation of the Layer-2 network devices with Layer-3 path trace data. The device may determine, based on the correlation, a Layer-2 path for the test path trace on the computing network. The device may integrate the Layer-2 path with the Layer-3 path trace data to generate an enriched path trace to identify a root cause of a performance degradation in the computing network.

20 Claims, 9 Drawing Sheets

614

GW IP node4 node3 node2 node1

700

702

{
"L2_path": [ "172.16.21.63", "172.16.21.64", "172.16.21.70"
],
"L2_hop_list": [],
"GW_mgmt_IP": "172.16.21.70",
"GW_uuid": "27a3f3e9-4370-404f-8964 6388f382089a"
}

Mgmt IP1:
Mgmt IP2:
Mgmt IP3:

AI Cloud

DP IP1

TE Cloud

Internet

DNAC

Mgmt IP1

Mgmt IP2

Mgmt IP3

DP IP1

Managed switch 1

Managed switch 2

Managed router2

DP IP1

Managed devices on TE test path

CEA
EPA

800

805

Start

810

Obtain Telemetry Data from Layer-2 Devices

815

Generate Correlation of Layer-2 Devices with Layer-3 Path Trace Data

820

Determine Layer-2 Path for Test Path Trace

825

Integrate the Layer-2 path with the Layer-3 Path Trace Data to Generate Enriched Path Trace

830

End

LAYER-2 PATH DISCOVERY OF ACTIVE PROBE CONNECTION MONITORING

TECHNICAL FIELD

The present disclosure relates generally to computer networks and more particularly to Layer-2 path discovery of active probe connection monitoring.

BACKGROUND

Effective management of modern computing networks increasingly relies on developing an understanding of their complex architectures to ensure optimal performance and reliability. Active Network Performance Monitoring (ANPM) tools depend on end-to-end Layer-3 connectivity to monitor and diagnose network issues.

These tools typically utilize path trace methods based on protocols like Internet Control Message Protocol (ICMP) and time-to-live (TTL) to map out network paths and assess performance metrics.

These path trace tools are limited to identifying Layer-3 hops, such as routers and is other Layer-3 devices, while failing to provide any visibility into the Layer-2 hops, such as switches, that the traffic traverses. This means that the intermediate Layer-2 devices, which can significantly impact network performance and contribute to test impairments, remain "invisible" in the path trace visualizations provided by many ANPM tools. As a result, observability platforms and network administrators are unable to see the full picture of the network path, which hampers effective troubleshooting and performance monitoring.

The absence of visibility into Layer-2 hops leads to several negative consequences. For example, if there are issues with specific switches or Layer-2 links, these problems go undetected, preventing or causing delays in identifying and resolving network performance issues. For example, in cases where ANPM probe test fail, the lack of Layer-2 data prevents administrators from pinpointing the exact source of the problem, such as a faulty switch port or a misconfigured VLAN. Thus, the Layer-2 blind spot associated with conventional ANPM tools hinders the ability to maintain a robust and high-performance network.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device may obtain telemetry data from Layer-2 network devices on a test path trace of a computing network. The device may generate, based on the telemetry data, a correlation of the Layer-2 network devices with Layer-3 path trace data. The device may determine, based on the correlation, a Layer-2 path for the test path trace on the computing network. The device may integrate the Layer-2 path with the Layer-3 path trace data to generate an enriched path trace to identify a root cause of a performance degradation in the computing network.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
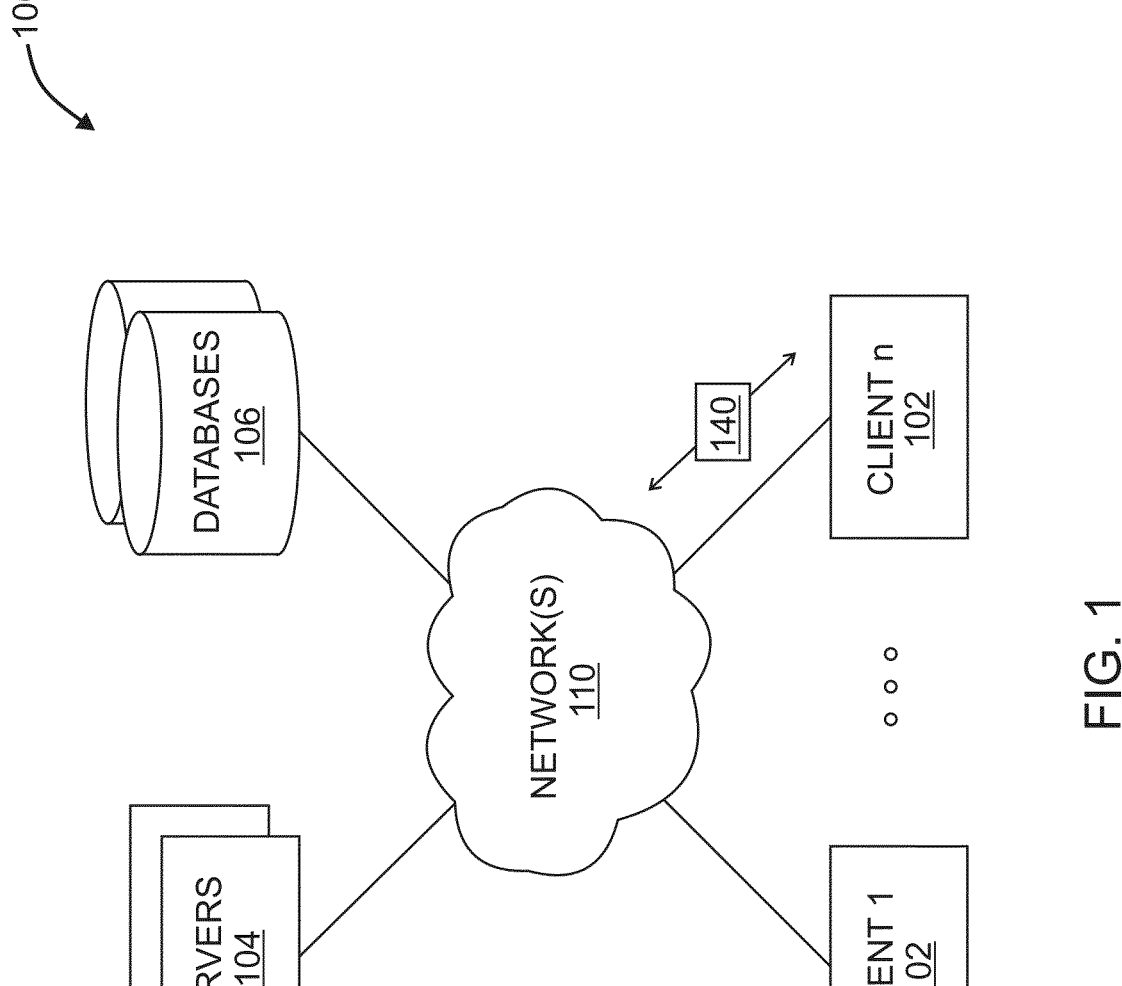
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
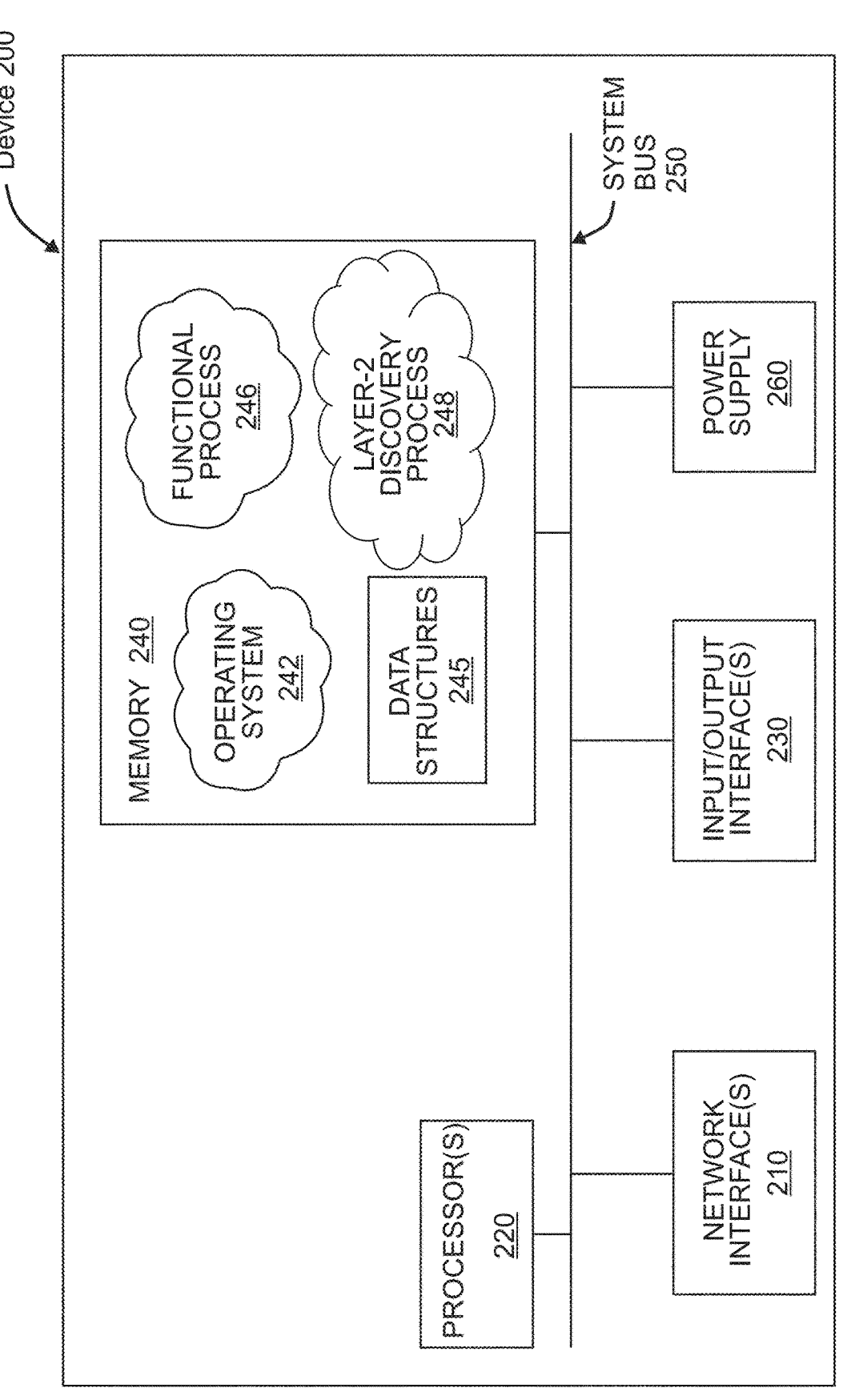
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as Layer-2 discovery process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, Layer-2 discovery process 248 may include computer executable instructions that, when executed by processor 220, cause device 200 to perform the techniques described herein. To do so, in some implementations, Layer-2 discovery process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, Layer-2 discovery process 248 may employ and/or be utilized to handle prompts to and/or access of one or more supervised, unsupervised, or semi-supervised machine learning models. Layer-2 discovery process 248 may employ and/or be utilized to handle prompts to and/or access of one or more supervised, unsupervised, or semi-supervised machine learning models trained to conduct Layer-2 discovery, compile (MAC, IP) tuples learned by Layer-2 devices through ARP/DHCP snooping, generate topology neighbor graphs based on Layer-2 discovery protocols, identify devices in a network and/or their capabilities, identify performance metrics, identify performance metric patterns, identify performance metric timelines, identify performance metric and component relationships, identify relationships between performance metrics and anomalies, anomaly detection, perform performance metric-based characterizations (e.g., scoring), perform root cause analysis, etc.

Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that Layer-2 discovery process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, Layer-2 discovery process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, Layer-2 discovery process 248 may be a component of, use, and/or be utilized in the management of prompts/access to a generative model to perform network mapping, generate configurations, analyses, root cause analysis, or other outputs based on a conversational input from a user (e.g., voice, text, etc.). In another example, Layer-2 discovery process 248 may utilize a generative model with a method invocation data collector (MIDC) to assist in automated or manual identification of transactional attributes for spans. In yet another example, Layer-2 discovery process 248 may be utilize a generative model to conduct Layer-2 discovery, compile (MAC, IP) tuples learned by Layer-2 devices through ARP/DHCP snooping, generate topology neighbor graphs based on Layer-2 discovery protocols, identify devices in a network and/or their capabilities, identify performance metrics, identify performance metric patterns, identify performance metric timelines, identify performance metric and component relationships, identify relationships between performance metrics and anomalies, anomaly detection, perform performance metric-based characterizations (e.g., scoring), perform root cause analysis, etc. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
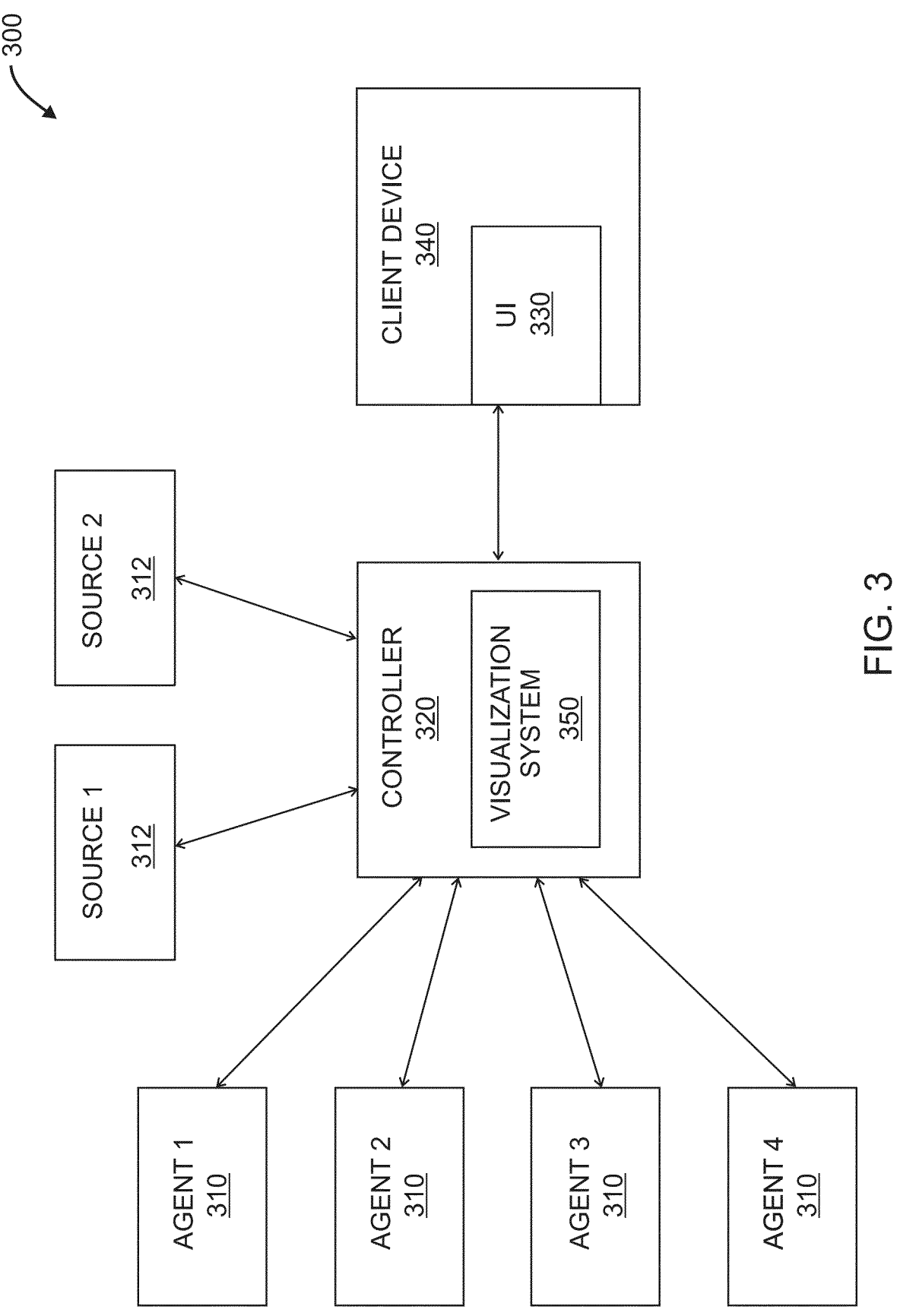
FIG. 3 illustrates an example observability intelligence platform.

FIG. 3 is a block diagram of an example of an observability intelligence platform 300 that can implement one or more aspects of the techniques herein. The observability intelligence platform 300 is a system that monitors and collects metrics of performance data for a network and/or application environment being monitored. At the simplest structure, the observability intelligence platform 300 includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the is operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform 300. The controller 320 may serve a user interface 330 (denoted UI in FIG. 3), such as a browser-based UI, that is the primary interface for monitoring, analyzing, and trouble-shooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the is instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, effective management of modern networks may require a comprehensive understanding of both Layer-2 and Layer-3 architectures to ensure optimal performance and reliability. However, traditional ANPM tools, which focus solely on Layer-3 connectivity, fail to provide visibility into the critical Layer-2 hops, leading to significant blind spots in network monitoring and troubleshooting. This lack of Layer-2 insight can result in unresolved performance issues, delayed problem identification, and incomplete network path visualization, ultimately hindering effective network management.

Further, some approaches to finding Layer-2 topology may be based on tables for the spanning tree algorithm available through SNMP, but this does not convey information on the path taken by the traffic generated by an endpoint. Furthermore, a "traceroute ethernet" command can be leveraged in a Service Provider network to determine a path from a maintenance endpoint (MEP) to a given MAC address, but it is not trivial to use and requires some configuration, like the definition of a maintenance domain and which MEPs and Maintenance Intermediate Points (MIP) are part of this domain. Moreover, a Layer-2 "traceroute mac" command may determine the Layer-2 path utilizing the MAC address tables of the switches in the path, but this is not reflective of traffic towards the Layer-3 gateway and relies on ARP responses which may be easily spoofed as they are not authenticated.

——Layer-2 Path Discovery of Active Probe Connection Monitoring ——

In contrast, the techniques described herein introduce a mechanism to provide observability of Layer-2 network devices traversed by the active network performance monitoring (ANPM) traffic, within the network managed by the customer. These devices may then be added to the standard Layer-3 path trace and shown in a UI visualization, such as for an observability intelligence platform, providing enhanced observability.

Illustratively, the techniques described herein may be performed by hardware, software, and/or firmware, such as in accordance with Layer-2 discovery process 248, which may include computer executable instructions executed by the processor 220 (or independent processor of interfaces 210) to perform functions relating to the techniques described herein.

Specifically, according to various implementations, a device may a device may obtain telemetry data from Layer-2 network devices on a test path trace of a computing network. The device may generate, based on the telemetry data, a correlation of the Layer-2 network devices with Layer-3 path trace data. The device may determine, based on the correlation, a Layer-2 path for the test path trace on the computing network. The device may integrate the Layer-2 path with the Layer-3 path trace data to generate an enriched path trace to identify a root cause of a performance degradation in the computing network.

Figure 4:
FIG. 4 illustrates an example of an environment for implementing Layer-2 path discovery of active probe connection monitoring.
Figure 4:
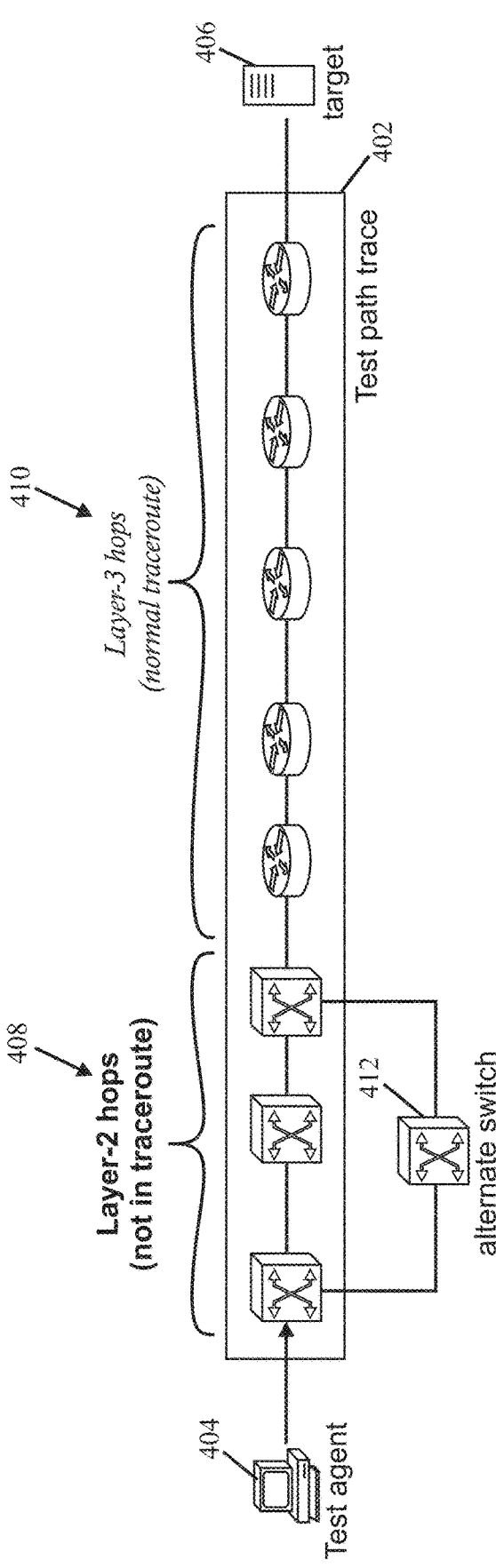

Operationally, FIG. 4 illustrates an example of an environment 400 for implementing Layer-2 path discovery of active probe connection monitoring, according to various implementations. Environment 400 includes a test path trace 402 of a network path traversed by probing traffic from a test agent 404 to a target 406 (e.g., a target node, device, application, etc.). For example, a test path trace 402 may include a trace of a path to a target 406 that is probed by an ANPM testing agent (e.g., ThousandEyes agent, etc.) to collect end-to-end network measurements (e.g., loss, jitter, latency, etc.).

As previously outlined, traditional traceroute approaches rely on the concept of TTL, which applies only to Layer-3 nodes (e.g., routers, etc.). However, active probing traffic from test agent 404 passes through both Layer-2 hops 408 and Layer-3 hops 410. Therefore, while the Layer-2 hops 408 can also affect the measurements and performance KPIs being collected, the Layer-2 hops 408 are not detected with traditional traceroute approaches and thus do not appear in path trace visualizations and/or analysis by ANPM tools, root cause identification tools, observability intelligence platforms, etc. In short, is traditional traceroute approaches have no concept of traceroute on Layer-2.

Now, implementing Layer-2 path discovery of active probe connection monitoring, visibility of Layer-2 nodes may be achieved and/or utilized to augment observability for an end user. For example, the device platform KPIs for resource usage may be collected. For instance, CPU/memory utilization for control plane, TCAM utilization for data plane, etc. may be collected through telemetry from network management solutions. This telemetry data may be integrated into network performance monitoring platforms and cloud-based analytics systems for comprehensive analysis and visualizations (e.g., to Catalyst Center and to AI Analytics cloud, and then integrated into ThousandEyes data). These KPIs can be shown for each Layer-2 node traversed by active test traffic and correlated in time with degradation in network test performance, thereby isolating and narrowing down the issue better for a network administrator.

Additionally, implementing Layer-2 path discovery of active probe connection monitoring may be leveraged by recording and baselining the Layer-2 path taken over time, to expose more insights and patterns for the network usage (e.g., if the "alternate switch" node 412 is used from time to time instead of the test path trace 402, due to some other nodes being down, or spanning tree protocol (STP) changing the forwarding ports in the network). Here, too, these changes may be correlated over time with probe test results.

Further, implementing Layer-2 path discovery of active probe connection monitoring may facilitate visibility of the Layer-2 devices that are never "covered" by active probe test. Showing such "network test coverage" may suggest new locations for tests to add. Furthermore, the telemetry data for Layer-2 hops may also contain device context information, not related to resource usage, such as software version running (e.g., for known issues and/or upgrades), system uptime, errors (e.g., from interface statistics, or malfunctioning hardware, connectors, fans, etc.). This data can also be shown within the context of active tests path visualization, and once more correlated in time with performance degradation, giving a clear root cause analysis.

Figure 5:
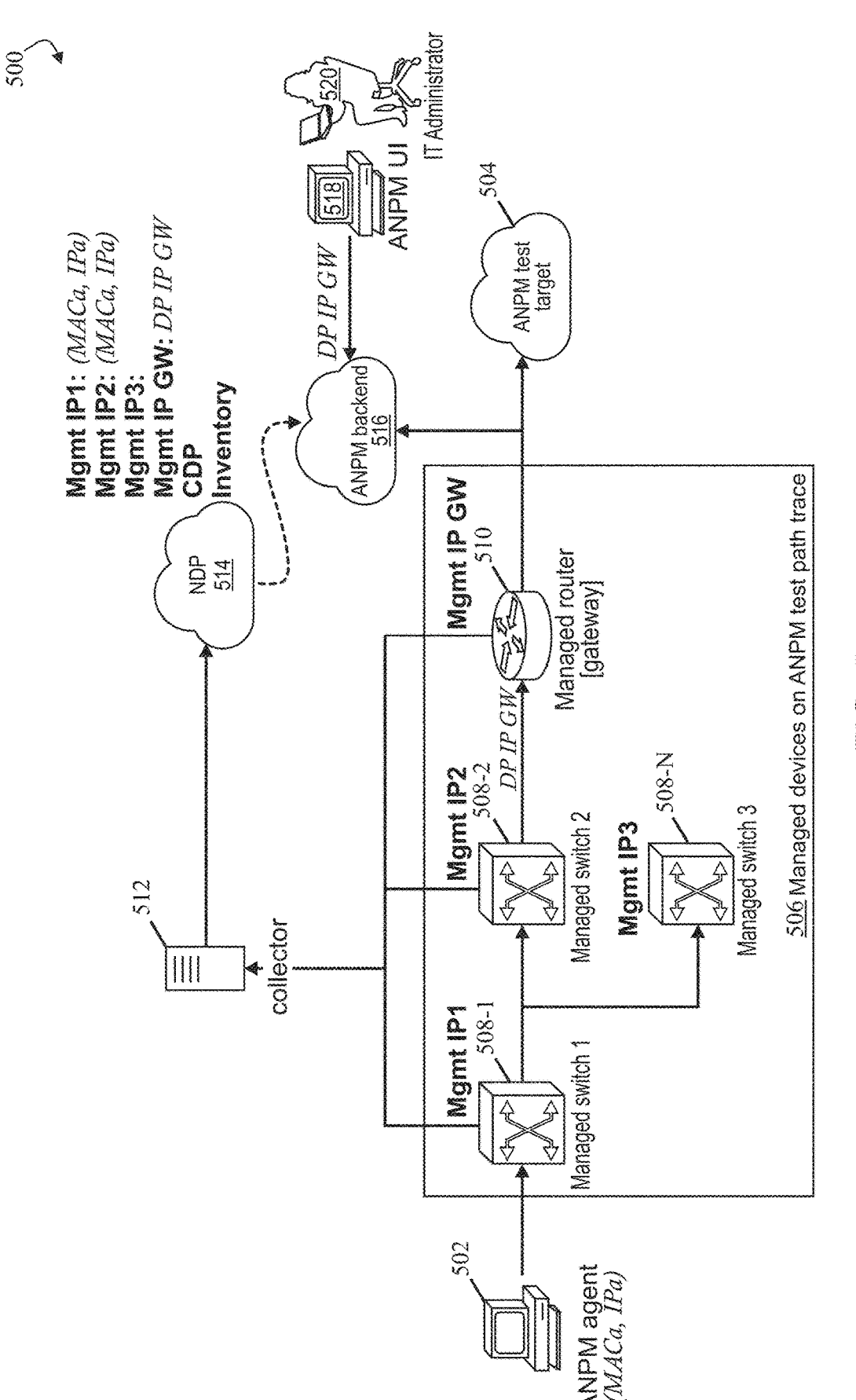
FIG. 5 illustrates an example of an architecture for Layer-2 path discovery of active probe connection monitoring.

FIG. 5 illustrates an example of an architecture 500 for Layer-2 path discovery of active probe connection monitoring, according to various implementations. Architecture 500 may include an ANPM agent 502. ANPM agent 502 may include an ANPM agent instances and/or device that is responsible for generating and/or sending test traffic through a network to an ANPM test target 504. The ANPM test target 504 may include a destination endpoint for the test traffic generate by the ANPM agent 502.

Architecture 500 may include a test path trace 506. There may be one or more managed devices on the test path trace 506. For example, test path trace 506 may include managed switches 508 (e.g., 508-1 . . . 508-N). The managed switches 508 may include Layer-2 devices that are configured to snoop on address resolution protocol/dynamic host configuration protocol (ARP/DHCP) traffic to collect (MAC, IP) address pairs of endpoints. This snooping may generate data that may be utilized in identifying the Layer-2 hops taken by the traffic.

Test path trace 506 may include a managed router 510. The managed router 510 may be a Leyer-3 hop and/or act as the gateway for the test traffic. The IP of the managed router 510 may be utilized to correlated with the first hop in the Layer-3 trace.

Architecture 500 may include a controller/collector 512 for receiving telemetry data from the managed infrastructure devices (e.g., managed switches 508, managed router 510, etc.). The controller/collector 512 may provide the collected data to a network data collector 514. This data may include client events (e.g., ARP/DHCP snooped data), inventory (e.g., local device interfaces and IP addresses), topology information (e.g., directly connected devices using Layer-2 discovery protocols like CDP/LLDP), etc.

In various implementations, the architecture 500 may include an ANPM backend 516. The ANPM backend 516 may process the collected telemetry data to infer Layer-2 hops and enrich Layer-3 path traces. It may be operable to reconstruct the Layer-2 network topology and integrate this information with active Layer-3 path traces. In some is instances, ANPM backend 516 may leverage the data and its analysis to perform root cause analysis.

Architecture 500 may include an ANPM user interface 518. The ANPM user interface 518 may operate as a conduit to provide an IT administrator 520 with access to and/or visualizations of ANPM path traces, including both Layer-2 and Layer-3 hops, providing enhanced observability for network performance monitoring and troubleshooting. The ANPM user interface 518 may provide IT administrator 520 with various visualizations of the collected telemetry data, data analysis results, suggestions for improving network performance based on the data analysis, root cause analysis/conclusions, etc.

In architecture 500, a network device may learn about endpoint traffic by snooping ARP and/or DHCP traffic (e.g., utilizing an IP device tracking feature such as Cisco IP Device Tracking feature (IP DT)). This snooping may be being performed for additional security reasons (e.g., to spot traffic originating from the same MAC address coming from different ports of a network switch, such as by ARP spoofing), through a switch integrated security feature (SISF). This data may also be used to track switched that do not perform routing and do not have ARP tables.

As outlined above, the controller/collector 512 and/or network data collector 514 may obtain such telemetry data from managed infrastructure devices in order to infer the Layer-2 hops forwarding the endpoint's traffic and so enrich the Layer-3 path trace. For instance, the components of architecture 500 may be utilized to obtain and leverage various data sets.

For example, a data set such as a list of "dataplane" Layer-3 addresses configured on a device may be obtained and/or utilized to correlate with the first Layer-3 hop of the path trace active monitoring (i.e., the gateway). Further, a data set such as a set of (MAC, IP) tuples learned by Layer-2 devices by IPDT/SISF through ARP/DHCP snooping may be obtained and/or utilized for Layer-2 discovery and integration. Furthermore, a data set such as a graph of topology neighbors based on Layer-2 discovery protocols (e.g., CDP/LLDP) may be obtained and/or utilized for Layer-2 discovery and/or integration. In such instances, the node key may be its management IP address. Moreover, a set of MAC addresses authenticating on access Layer-2 devices (e.g., IEEE 802.1X) may be optionally obtained and/or utilized for Layer-2 discovery and/or integration.

Layer-2 path discovery and integration may proceed under a prerequisite that managed infrastructure devices continuously perform one or more of the operations outlined below and/or send the outcome as part of telemetry data to the network data collector 514 for analysis. This may include snooping ARP/DHCP traffic, collecting (MAC, IP) addresses of clients, and/or sending this as "client events" telemetry data. Further, this may include collecting the local device interfaces, together with their IP addresses, as "inventory" telemetry data and/or collecting the CDP neighbor devices (i.e., directly connected to their local interfaces) as "topology" telemetry data.

Then, ANPM backend 516 may perform one or more or combinations of the various operations outlined below when, for example, an IT administrator 520 requests a visualization of an ANPM path trace, a root cause analysis, etc. on the ANPM user interface 518. For example, in a first operation, the ANPM backend 516 may look up the set of managed devices (e.g., keyed by management IP address) that have snooped ARP/DHCP traffic for the MAC address (e.g., MACa in FIG. 5) of ANPM agent 502, searching within the "client events" dataset. This resulting set may be called "L2 hops" (e.g., managed switch 508-1 and managed switch 508-2).

In a second operation, ANPM backend 516 may look up the managed device that has the "dataplane IP address" (e.g., "DP IP GW" in FIG. 5) equal to the first Layer-3 hop of the path trace test (e.g., managed router 510 which may be called "gateway"), searching within the inventory dataset. If found, its management IP address may be obtained. Conversely, if there is no match, then an "L2 path" cannot be returned. This can happen in some uncommon cases, such as where the DHCP traffic does not pass through the gateway (e.g., using DHCP relay).

In a third operation, ANPM backend 516 may look up the Layer-2 neighbors of the gateway from the topology dataset, and/or filter for a match with the "L2 hops" as from the first operation described above. ANPM backend 516 may append the match found to the ordered list of Layer-2 devices (e.g., which may be called "L2 path") and/or remove the match from the L2 hops.

In a fourth operation, ANPM backend 516 may repeat these operations (e.g., the second and third operations), replacing "gateway" with the last node match found in the prior operation (e.g., the third operation). ANPM backend 516 may continue until either the L2 hops list is empty, or no match is found. If the L2 hops list is empty, this may mean that an L2 path was found successfully. If no match is found, and the L2 hops is still not empty, the solution may also be incomplete. This could be caused by switches that do not collect/learn (MAC, IP) through ARP/DHCP snooping or do not export them for some reason. The final "L2 path" may include the ordered list of nodes from the ANPM agent running the test to the gateway.

In additional implementations, another approach may be taken whereby Layer-2 path discovery and integration may proceed under a prerequisite that managed infrastructure devices collect telemetry data as outlined above. Again, ANPM backend 516 may perform one or more or a combination of the various operations outlined below when, for example, an IT administrator 520 requests a visualization of an ANPM path trace, a root cause analysis, etc. on the ANPM user interface 518.

Here, the ANPM backend 516 may reconstruct the whole Layer-2 network topology from CDP/LLDP telemetry data. The topology graph may be filtered by the "L2 hops" set (as defined in the "first operation" outlined above). If the gateway is not connected to the resulting filtered graph as outlined above, then an "L2 path" may not be able to be returned, like the operation outlined above (like the implementation described with respect to the second operation described above). If the resulting filtered graph has disjointed sub-graphs, then the solution may also be incomplete, like the fourth operation outlined above. Otherwise, the resulting filtered graph may have the ordered list of nodes from the ANPM agent 502 running the test to the gateway.

Across the various implementations described above, if an optional telemetry dataset of MAC addresses authenticating on access Layer-2 devices (e.g., IEEE 802.1X) is available, with the related access device management IP addresses, this represents an additional and very reliable data source for the first Layer-2 hop, that can be integrated in the L2 path obtained above.

Figure 6A:
FIGS. 6A-6B illustrate an example of a Layer-2 topology evaluation in Layer-2 is path discovery of active probe connection monitoring.
Figure 6A:
Figure 6B:

FIGS. 6A-6B illustrate an example of a Layer-2 topology evaluation 600 in Layer-2 path discovery of active probe connection monitoring, according to various implementations. The Layer-2 topology evaluation 600 may include a Layer-2 topology 602. Within Layer-2 topology 602, an active test agent may be attached to a first node 604 and may be configured with 'GW_IP' as the default gateway 606. Layer-2 topology 602 may include set of "L2 hops" (e.g., identified from managed network telemetry data, as described above) such as a fourth node 608, third node 610, second node 612, and/or first node 604. Here, the active test agent may be running an active Layer-3 test, such that the path traverses 'GW_IP.'

The Layer-2 topology evaluation 600 based on Layer-2 path discovery of active probe connection monitoring may generate an "L2 path" result 614. Note that after a successful L2 path result (e.g., "L2 path" result 614) has been discovered, in case of network devices outages it may be utilized, even as a partial path, that can be leveraged to point to the root of an issue. For example, this can be achieved with storing a time series in ANPM backend and detecting changes in time, especially if they correlate in time with active network test failures. In various implementations, the ANPM UI can highlight such cases, based on queries to the backend.

Figure 7:
FIG. 7 illustrates an example of an architecture being utilized for Layer-2 path discovery of active probe connection monitoring.

FIG. 7 illustrates an example of an architecture 700 being utilized for Layer-2 path discovery of active probe connection monitoring, according to various implementations. Here, the Layer-2 discovery and integration is implemented utilizing an ANPM endpoint agent (e.g., ThousandEyes Endpoint Agent, etc.) and/or data collected by a network management system (e.g., Cisco Catalyst Center, etc.) from a laboratory deployment. Here, the management IP address of the switches is used as identifier of Layer-2 hops.

The deployment includes an ANPM endpoint agent implemented in a virtual appliance, a switch, and a virtual router. The wired client events (e.g., wired auth/MAC events/updates) have been saved in an AI analytic cloud. An API may trigger an AWS lambda function that queries AI analytics telemetry data and wired client events from a database. The first Layer-3 hop (e.g., gateway) may be retrieved from the ANPM agent's standard path trace test data (e.g., using public ANPM APIs for test data related to the endpoint agent, or internal equivalent databases utilized by the ANPM UI. This may be utilized to generate the API result 702.

Figure 8:
FIG. 8 illustrates an example of a simplified procedure for Layer-2 path discovery of active probe connection monitoring, in accordance with one or more implementations described herein.

FIG. 8 illustrates an example of a simplified procedure for Layer-2 path discovery of active probe connection monitoring, in accordance with one or more implementations described herein. For example, a non-generic, specifically configured device (e.g., device 200), may perform procedure 800 (e.g., a method) by executing stored instructions (e.g., Layer-2 discovery process 248).

The procedure 800 may start at step 805, and continues to step 810, where, as described in greater detail above, the device (e.g., a controller, processor, etc.) may obtain telemetry data from Layer-2 network devices on a test path trace of a computing network. The telemetry data may be learned by the Layer-2 network devices by monitoring address resolution protocol and dynamic host configuration protocol traffic. The telemetry data may include media access control address and internet protocol address tuples for endpoints in the computing network. The telemetry data may include a graph of topology neighbors in the computing network based on Layer-2 discovery protocols. In various implementations, the telemetry data may include a set of media access control addresses authenticating on the Layer-2 network devices At step 815, as detailed above, the device may generate, based on the telemetry data, a correlation of the Layer-2 network devices with Layer-3 path trace data. generating the correlation may include identifying a set of Layer-2 hops in the Layer-2 path based on a media access control address of each of the Layer-2 network devices. Further, generating the correlation may include identifying a particular Layer-2 network device with a dataplane internet protocol address equal to a first Layer-3 hop of the test path trace.

At step 820, the device may determine, based on the correlation, a Layer-2 path for the test path trace on the computing network. Determining the Layer-2 path may include identifying, based on a topology dataset, Layer-2 neighbors of the particular Layer-2 network device that match Layer-2 hops in the set of Layer-2 hops. Further, determining the Layer-2 path may include appending matching Layer-2 neighbors to a model of the Layer-2 path until all Layer-2 hops in the set of Layer-2 hops have been appended to the Layer-2 path and/or until no match is found.

At step 825, the device may integrate the Layer-2 path with the Layer-3 path trace data to generate an enriched path trace to identify a root cause of a performance degradation in the computing network. For example, the root cause of the performance degradation may be identified by detecting a pattern in a time series of performance metrics for the enriched path trace that correlate with an active network test failure. Further, the enriched path trace may be provided to a user via a user interface to identify the root cause of a performance degradation in the computing network.

In various implementations, Layer-2 devices that are not covered by an active probe test may be identified based on the enriched path trace. Then, a location for a subsequent active probe test may be suggested to cover the Layer-2 devices that are not covered by the active probe test.

Procedure 800 then ends at step 830.

It should be noted that while certain steps within procedure 800 may be optional as described above, the steps shown in FIG. 8 are merely examples for illustration, and certain other steps may be included or excluded as desired.

Further, while a particular order of the steps is shown, this ordering is merely illustrative, and any suitable arrangement of the steps may be utilized without departing from the scope of the implementations herein.

The techniques described herein, therefore, introduce a significant advancement in network path discover and performance monitoring by seamlessly integrating Layer-2 path data and its discovery with traditional Layer-3 path traces. By leveraging endpoint network address monitoring techniques and sophisticated correlation operations, these techniques provide a comprehensive view of the entire network path, including previously undetected Layer-2 hops.

This enriched path trace may enhance the ability to troubleshoot network issues effectively and ensure more accurate performance monitoring. For instance, identifying specific Layer-2 devices that contribute to network impairments may allow for targeted troubleshooting and quicker resolution of issues. Additionally, the ability to visualize and analyze the full network path, including both Layer-2 and Layer-3 devices, provides network administrators with actionable insights into network health and performance, leading to more reliable and efficient network operations. This holistic approach to network path discovery directly translates to tangible improvements in network management and operational efficiency, addressing critical challenged in modern network environments.

While there have been shown and described illustrative implementations that provide for Layer-2 path discovery of active probe connection monitoring, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:
   obtaining, by a device, telemetry data from Layer-2 network devices on a test path trace of a computing network;
   generating, by the device and based on the telemetry data, a correlation of the Layer-2 network devices with Layer-3 path trace data;
   determining, by the device and based on the correlation, a Layer-2 path for the test path trace on the computing network;
   integrating, by the device, the Layer-2 path with the Layer-3 path trace data to generate an enriched path trace to identify a root cause of a performance degradation in the computing network;
   identifying, based on the enriched path trace, one or more Layer-2 devices that are not covered by an active probe test; and suggesting a location for a subsequent active probe test to cover the one or more Layer-2 devices that are not covered by the active probe test.

2. The method as in claim 1, wherein the telemetry data includes a graph of topology neighbors in the computing network based on Layer-2 discovery protocols.

3. The method as in claim 1, wherein the telemetry data includes a set of media access control addresses authenticating on the Layer-2 network devices.

4. The method as in claim 1, wherein the telemetry data is learned by the Layer-2 network devices by monitoring address resolution protocol and dynamic host configuration protocol traffic.

5. The method as in claim 4, wherein the telemetry data includes media access control address and internet protocol address tuples for endpoints in the computing network.

6. The method as in claim 1, wherein generating the correlation includes:

identifying a set of Layer-2 hops in the Layer-2 path based on a media access control address of each of the Layer-2 network devices; and identifying a particular Layer-2 network device with a dataplane internet protocol address equal to a first Layer-3 hop of the test path trace.

7. The method as in claim 6, wherein determining the Layer-2 path includes:

identifying, based on a topology dataset, Layer-2 neighbors of the particular Layer-2 network device that match Layer-2 hops in the set of Layer-2 hops; and appending matching Layer-2 neighbors to a model of the Layer-2 path until all Layer-2 hops in the set of Layer-2 hops have been appended to the Layer-2 path or until no match is found.

8. The method as in claim 1, further comprising:

identifying the root cause of the performance degradation by detecting a pattern in a time series of performance metrics for the enriched path trace that correlate with an active network test failure.

9. The method as in claim 1, further comprising:

providing the enriched path trace to a user via a user interface to identify the root cause of the performance degradation in the computing network.

10. An apparatus, comprising:

one or more network interfaces;

a processor coupled to the one or more network interfaces and configured to execute one or more processes; and a memory configured to store a process that is executable by the processor, the process when executed configured to:

obtain telemetry data from Layer-2 network devices on a test path trace of a computing network;

generate, based on the telemetry data, a correlation of the Layer-2 network devices with Layer-3 path trace data;

determine, based on the correlation, a Layer-2 path for the test path trace on the computing network;

integrate the Layer-2 path with the Layer-3 path trace data to generate an enriched path trace to identify a root cause of a performance degradation in the computing network, identify, based on the enriched path trace, one or more Layer-2 devices that are not covered by an active probe test; and suggest a location for a subsequent active probe test to cover the one or more Layer-2 devices that are not covered by the active probe test.

11. The apparatus as in claim 10, wherein the telemetry data includes a graph of topology neighbors in the computing network based on Layer-2 discovery protocols.

12. The apparatus as in claim 10, wherein the telemetry data includes a set of media access control addresses authenticating on the Layer-2 network devices.

13. The apparatus as in claim 10, wherein the telemetry data is learned by the Layer-2 network devices by monitoring address resolution protocol and dynamic host configuration protocol traffic.

14. The apparatus as in claim 13, wherein the telemetry data includes media access control address and internet protocol address tuples for endpoints in the computing network.

15. The apparatus as in claim 10, wherein the process is further configured to:

identify a set of Layer-2 hops in the Layer-2 path based on a media access control address of each of the Layer-2 network devices; and identify a particular Layer-2 network device with a dataplane internet protocol address equal to a first Layer-3 hop of the test path trace.

16. The apparatus as in claim 15, wherein the process is further configured to:

identify, based on a topology dataset, Layer-2 neighbors of the particular Layer-2 network device that match Layer-2 hops in the set of Layer-2 hops; and append matching Layer-2 neighbors to a model of the Layer-2 path until all Layer-2 hops in the set of Layer-2 hops have been appended to the Layer-2 path or until no match is found.

17. The apparatus as in claim 10, wherein the process is further configured to:

identify the root cause of the performance degradation by detecting a pattern in a time series of performance metrics for the enriched path trace that correlate with an active network test failure.

18. A tangible, non-transitory, computer-readable medium storing program instructions that cause a device to execute a process comprising:

obtaining telemetry data from Layer-2 network devices on a test path trace of a computing network;

generating, based on the telemetry data, a correlation of the Layer-2 network devices with Layer-3 path trace data;

determining, based on the correlation, a Layer-2 path for the test path trace on the computing network;

integrating the Layer-2 path with the Layer-3 path trace data to generate an enriched path trace to identify a root cause of a performance degradation in the computing network, identifying, based on the enriched path trace, one or more Layer-2 devices that are not covered by an active probe test; and suggesting a location for a subsequent active probe test to cover the one or more Layer-2 devices that are not covered by the active probe test.

19. The method as in claim 1, wherein identifying, based on the enriched path trace, the one or more Layer-2 devices that are not covered by the active probe test and suggesting the location for the subsequent active probe test to cover the one or more Layer-2 devices that are not covered by the active probe test comprises using an observability intelligence platform for identifying the one or more Layer-2 devices and suggesting the location.

20. The apparatus as in claim 10, wherein to identify, based on the enriched path trace, the one or more Layer-2 devices that are not covered by the active probe test and suggest the location for the subsequent active probe test to cover the one or more Layer-2 devices that are not covered by the active probe test comprises to use an observability intelligence platform to identify the one or more Layer-2 devices and suggest the location.

* * * * *